United States Patent
Lim

(10) Patent No.: US 9,281,977 B2
(45) Date of Patent: Mar. 8, 2016

(54) APPARATUS AND METHOD FOR SEPARATING TWO PHASE-MODULATED SIGNALS HAVING DIFFERENT AMPLITUDES

(71) Applicant: Electronics and Telecommunications Research Institute, Daejeon (KR)

(72) Inventor: Jong Soo Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/598,416

(22) Filed: Jan. 16, 2015

(65) Prior Publication Data

US 2015/0207655 A1 Jul. 23, 2015

(30) Foreign Application Priority Data

Jan. 17, 2014 (KR) .................. 10-2014-0006229

(51) Int. Cl.
*H03C 3/00* (2006.01)
*H04L 27/227* (2006.01)
*H04L 27/20* (2006.01)

(52) U.S. Cl.
CPC .......... *H04L 27/2273* (2013.01); *H04L 27/206* (2013.01)

(58) Field of Classification Search
None
See application file for complete search history.

(56) References Cited

FOREIGN PATENT DOCUMENTS

KR 1020120090735 A 8/2012

OTHER PUBLICATIONS

Steve C. Thompson et al. Constant Envelope OFDM, IEEE Transactions on Communications, Aug. 2008, pp. 1300-1312, vol. 56, No. 8, IEEE.

*Primary Examiner* — Adolf Dsouza
(74) *Attorney, Agent, or Firm* — William Park & Associates Ltd.

(57) ABSTRACT

Provided is an apparatus and method for separating two phase-modulated signals having different amplitudes. A separation method for a phase-modulated signal may include: receiving, using a single antenna, a first received signal and a second received signal that are modulated and thereby transferred from a transmitter; calculating an attenuation level of each of the first received signal and the second received signal by dividing each of the first received signal and the second received signal into a real number portion and an imaginary number portion; calculating a difference between the first received signal and the second received signal; and separating and thereby demodulating the first received signal and the second received signal.

11 Claims, 4 Drawing Sheets

400

APPARATUS AND METHOD FOR SEPARATING TWO PHASE-MODULATED SIGNALS HAVING DIFFERENT AMPLITUDES

CROSS-REFERENCE TO RELATED APPLICATION

This application claims the priority benefit of Korean Patent Application No. 10-2014-0006229, filed on Jan. 17, 2014, in the Korean Intellectual Property Office, the disclosure of which is incorporated herein by reference.

BACKGROUND

1. Field of the Invention

The present invention relates to an apparatus and method for separating two phase-modulated signals having different amplitudes.

2. Description of the Related Art

Amplitude modulation refers to a modulation method of changing an amplitude of carrier based on strength of an information signal and may be weak against multipath fading due to a multipath of propagation and may have a high peak-to-average power ratio (PAPR). However, phase modulation may carry an information signal using a phase of carrier and thereby transmit the information signal and thus, may have a consistent amplitude of carrier. The phase modulation may have a relatively excellent noise characteristic compared to the amplitude modulation. Further, the phase modulation may have a significantly low PAPR, and may require a relatively wide transmission bandwidth compared to the amplitude modulation.

In general, a high PAPR may cause a nonlinear distortion in a power amplifier of a transmitter. Unless sufficient backoff is not given with respect to power, a frequency spectrum of a system may be widened and a distortion by mutual modulation between frequencies may occur, which may result in degrading the system performance.

SUMMARY

An embodiment of the present invention provides an apparatus and method for providing two different pieces of information using a single antenna, and more particularly, an apparatus and method that enables a reception end to restore two phase-modulated signals having different amplitudes to original signals when the two phase-modulated signals are transmitted from a transmitter using the same spectrum.

An embodiment of the present invention also provides an apparatus and method that enables a reception end to restore two phase-modulated signals having different amplitudes to original signals when the two phase-modulated signals are transmitted from a transmitter using the same carrier, and that may provide different services using a single antenna since it is possible to transmit two independent phase-modulated signals using the same spectrum.

According to an aspect of the present invention, there is provided a separation method for a phase-modulated signal, the method including: receiving, using a single antenna, a first received signal and a second received signal that are modulated and thereby transferred from a transmitter; calculating an attenuation level of each of the first received signal and the second received signal by dividing each of the first received signal and the second received signal into a real number portion and an imaginary number portion; calculating a difference between the first received signal and the second received signal; and separating and thereby demodulating the first received signal and the second received signal.

The receiving may include receiving a merged signal in which the first received signal and the second received signal are merged. The first received signal may be a signal in which a first transmission signal from the transmitter is attenuated by a transmission loss, and the second received signal may be a signal in which a second transmission signal from the transmitter is attenuated by the transmission loss.

The first received signal may have a form of $\eta(\sin(\theta_1) + j^*\cos(\theta_1))$, the second received signal may have a form of $\mu(\cos(\theta_2) - j^*\sin(\theta_2))$, $\sin(\theta_1) + j^*\cos(\theta_1)$ may represent the first transmission signal, $\eta$ may denote an attenuation rate of the first transmission signal by the transmission loss with respect to the first transmission signal, $\cos(\theta_2) - j^*\sin(\theta_2)$ may represent the second transmission signal, and $\mu$ may denote an attenuation rate of the second transmission signal by the transmission loss with respect to the second transmission signal.

The calculating of the attenuation level may include: adding up a square of an absolute value of an addition of real number portions of a merged signal in which the first received signal and the second received signal are merged, a square of an absolute value of an addition of imaginary number portions of the merged signal, a square of an absolute value of a difference between the real number portions of the merged signal, and a square of an absolute value of a difference between the imaginary number portions of the merged signal; and calculating the attenuation level of each of the first received signal and the second received signal using the addition result.

According to another aspect of the present invention, there is provided a receiver, including: an antenna configured to receive a merged signal in which a first received signal in which a first transmission signal is attenuated by a transmission loss and a second received signal in which a second transmission signal is attenuated by the transmission loss are merged; and a demodulator configured to separate the first received signal and the second received signal by dividing each of the first received signal and the second received into a real number portion and an imaginary number portion, and to demodulate the first received signal and the second received signal.

EFFECT

According to embodiments of the present invention, there may be provided a method and apparatus that enables a receiver to separate two phase-modulated signals having different amplitudes to original signals when the two phase-modulated signals having different amplitudes are transmitted using a single antenna.

According to embodiments of the present invention, when there is a need to simultaneously provide two services using the same spectrum and a single antenna, for example, when wide-area broadcasting and local broadcasting are to be simultaneously transmitted, the present invention may be employed to develop a transmission/reception and modulation/demodulation apparatus of a wireless communication field in which a hierarchical service separation is required.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
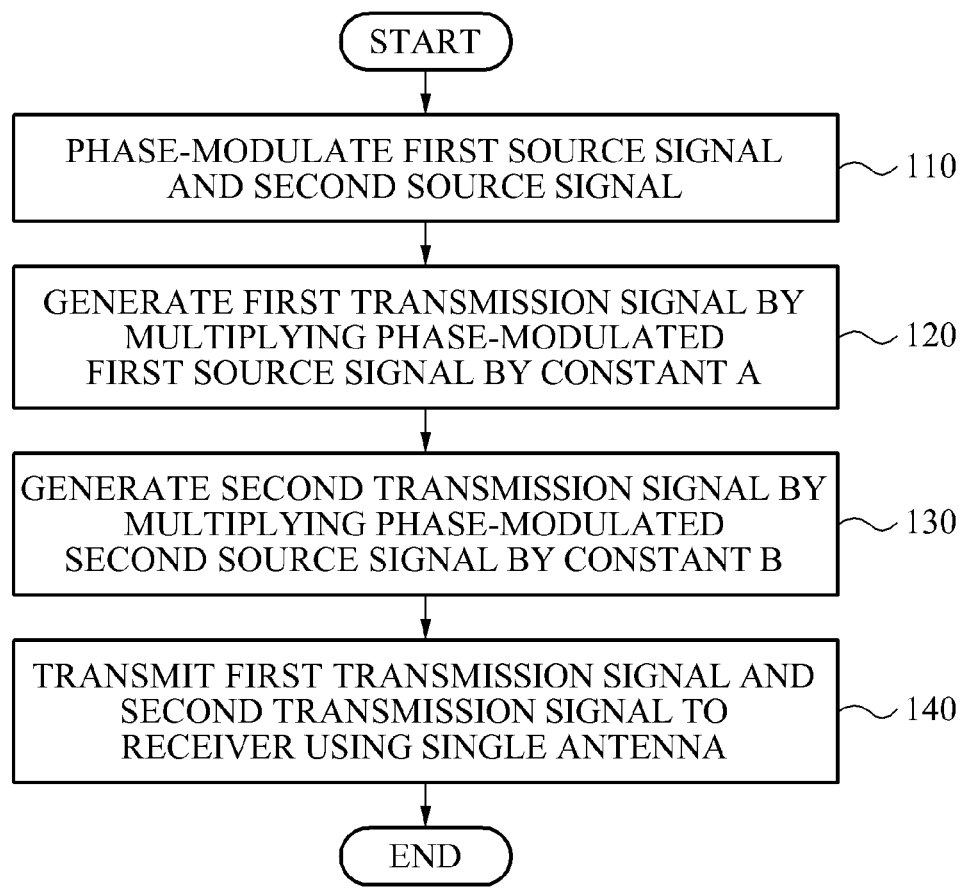
FIG. 1 is a flowchart illustrating an operation method of a transmitter configured to generate and transmit two phase-modulated signals having different amplitudes according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a method of separating two phase-modulated signals having different amplitudes and a transmitter and a receiver thereof according to an embodiment of the present invention will be described with reference to the accompanying drawings.

An operation in which a transmitter phase-modulates two different signals, multiplies the two phase-modulated signals by different amplitudes, respectively, and transmits the two phase-modulated signals having different amplitudes to a receiver, and the receiver restores each of the phase-modulated two signals to an original signal will be described.

FIG. 1 is a flowchart illustrating an operation method of a transmitter configured to generate and transmit two phase-modulated signals having different amplitudes according to an embodiment of the present invention.

In operation 110, the transmitter may phase-modulate a first source signal and a second source signal. The first source signal and the second source signal may be different types of independent frequency signals, and may be phase-modulated using different modulators, respectively.

In operation 120, the transmitter may generate a first transmission signal by multiplying the phase-modulated first source signal by constant A. Depending on embodiments, the phase-modulated first source signal may be amplified by the constant A using an amplifier.

In operation 130, the transmitter may generate a second transmission signal by multiplying the phase-modulated second source signal by constant B. Depending on embodiments, the phase-modulated second source signal may be amplified by the constant B using an amplifier different from the amplifier used to amplify the phase-modulated first source signal.

Accordingly, in operation 140, the transmitter may transmit the first transmission signal and the second transmission signal to a receiver using a single antenna.

According to an embodiment, the first transmission signal and the second transmission that are signals in which the first source signal and the second source signal are phase-modulated in operation 110 and are amplified to have different amplitudes in operations 120 and 130, and that are transmitted to the receiver in operation 140 may be expressed by the following Equation 1 and Equation 2.

$$\alpha(\sin(\theta_1)+j^*\cos(\theta_1)), \alpha(\sin(\theta_1)-j^*\cos(\theta_1)),$$

$$\alpha(-\sin(\theta_1)+j^*\cos(\theta_1)), \alpha(-\sin(\theta_1)-j^*\cos(\theta_1)) \quad \text{[Equation 1]}$$

$$\beta(\sin(\theta_2)+j^*\cos(\theta_2)), \beta(\sin(\theta_2)-j^*\cos(\theta_2)),$$

$$\beta(-\sin(\theta_2)+j^*\cos(\theta_2)), \beta(-\sin(\theta_2)-j^*\cos(\theta_2)) \quad \text{[Equation 2]}$$

Here, $\theta_1$ denotes the first source signal and $\theta_2$ denotes the second source signal.

Equation 1 expresses the first transmission signal that is the constant $\alpha$-multiplied phase-modulated first source signal, and Equation 2 expresses the second transmission signal that is the constant $\beta$-multiplied phase-modulated second source signal. A source signal may be expressed using at least one of Equation 1 and Equation 2, and may be further variously expressed based on a sign.

To separate two received signals, the receiver may limit the range of each of $\theta_1$ and $\theta_2$, which need to satisfy |minimum value of $\theta_1$−maximum value of $\theta_2$|<180 degrees and |minimum value $\theta_2$−maximum value of $\theta_1$|<180 degrees. Also, |(minimum value of $\theta_1$+minimum value of $\theta_2$)−maximum value of $\theta_1$+maximum value of $\theta_2$)|<180 degrees needs to be satisfied.

For example, when the phase range of the first source signal for phase-modulation is assumed to be from minimum −60 degrees to maximum +60 degrees, the phase range of the second source signal may be given to be from minimum −30 degrees to maximum +30 degrees.

As described above, in operation 140, a merged signal in which two phase-modulated signals having different amplitudes are merged may be transmitted using a single antenna.

Figure 2:
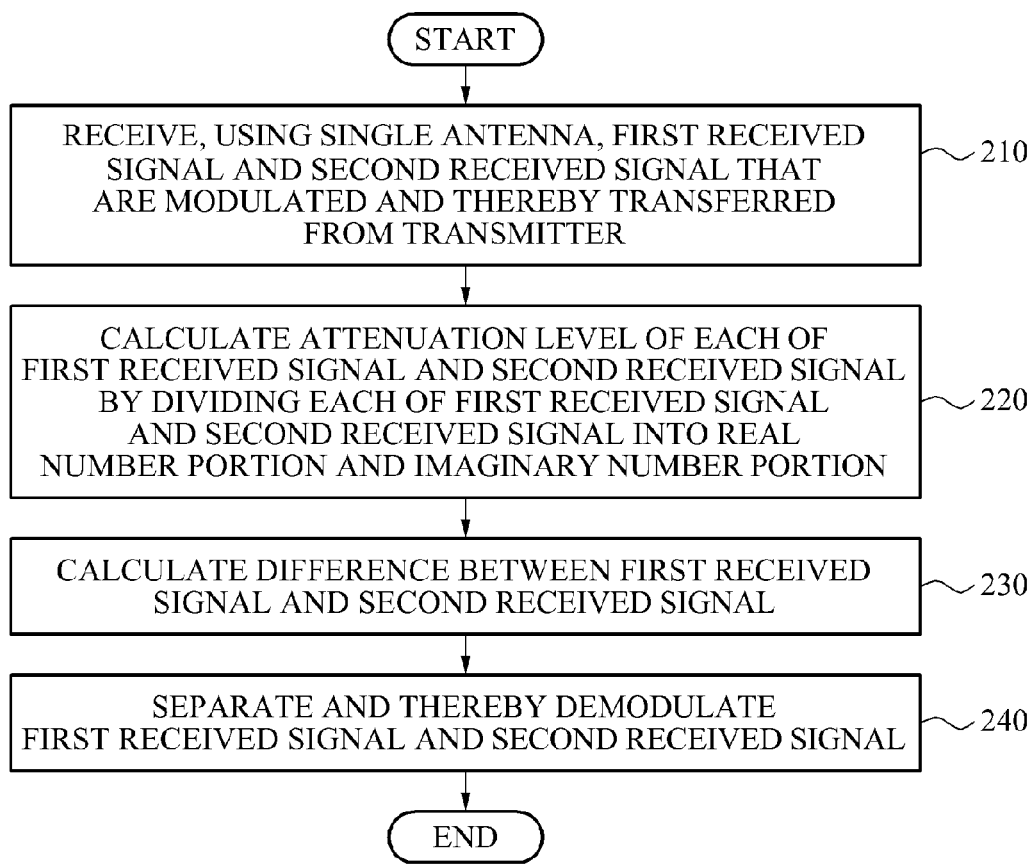
FIG. 2 is a flowchart illustrates an operation method of a receiver configured to receive and separate two phase-modulated signals having different amplitudes according to an embodiment of the present invention.

FIG. 2 is a flowchart illustrates an operation method of a receiver configured to receive and separate two phase-modulated signals having different amplitudes according to an embodiment of the present invention.

In operation 210, the receiver may receive, using a single antenna, a first received signal and a second received signal that are modulated and thereby transferred from a transmitter. Here, the first received signal and the second received signal are signals in which a first transmission signal and a second transmission signal from the transmitter are attenuated by a transmission loss, respectively. The first received signal and the second received signal may be received using a single antenna as a merged signal in which the first received signal and the second received signal are merged.

The first received signal and the second received signal may be expressed by the following Equation 3.

$$\eta(\sin(\theta_1)+j^*\cos(\theta_1))$$

$$\mu(\cos(\theta_2)-j^*\sin(\theta_2)) \quad \text{[Equation 3]}$$

In Equation 3, $\sin(\theta_1)+j^*\cos(\theta_1)$ denotes the first transmission signal, $\cos(\theta_2)-j^*\sin(\theta_2)$ denotes the second transmission signal, $\eta$ denotes an attenuation rate of the first transmission signal by a transmission loss with respect to the first transmission signal, and $\mu$ denotes an attenuation rate of the second transmission signal by a transmission loss with respect to the second transmission signal.

As another example, when the transmitter phase-modulates the second transmission) signal to $-\sin(\theta_2)-j^*\cos(\theta_2)$, the second received signal may be $\mu(-\sin(\theta_2)-j^*\cos(\theta_2))$. Here, $\mu$ denotes an attenuation rate at which the second transmission signal is attenuated by the transmission loss.

In operation 220, the receiver may calculate an attenuation level of each of the first received signal and the second received signal by dividing each of the first received signal and the second received signal into a real number portion and an imaginary number portion. In operation 230, the receiver may calculate a difference between the first received signal and the second received signal. In operation 240, the receiver may separate and thereby demodulate the first received signal and the second received signal.

|REAL(first received signal+second received signal)|$^2$+|IMAGINARY(first received signal+second received signal)|$^2$+|REAL(first received signal−second received signal)|$^2$+|IMAGINARY(first received signal−second received signal)|$^2$=2*($\eta^2$+$\mu^2$)    [Equation 4]

A square of an absolute value of an addition of real number portions of the merged signal, a square of an absolute value of an addition of imaginary number portions of the merged signal, a square of an absolute value of a difference between the real number portions of the merged signal, and a square of an absolute value of a difference between the imaginary number portions of the merged signal may have the relationship as expressed by Equation 4. Here, REAL(Y) denotes a function of extracting only a real number value of Y, and IMAGINARY (Z) denotes a function of extracting an imaginary value of Z.

For example, when the first received signal is $\eta(\sin(\theta_1)+j*\cos(\theta_1))$ and the second received signal is $\mu(\cos(\theta_2)-j*\sin(\theta_2))$, an addition of the first received signal and the second received signal may be calculated as $\{\eta \sin(\theta_1)+\mu \cos(\theta_2)\}+j*\{\eta \cos(\theta_1)-\mu \sin(\theta_2)\}$. |REAL(first received signal+second received signal)|$^2$+|IMAGINARY(first received signal+second received signal)|$^2$ may be arranged as follows:

$$\eta^2 * \sin(\theta_1)^2 + \mu^2 * \cos(\theta_2)^2 + 2*\eta*\mu*\sin(\theta_1)\cos(\theta_2) + \eta^2 * \cos(\theta_1)^2 +$$
$$\mu^2 * \sin(\theta_2)^2 - 2*\eta*\mu*\cos(\theta_1)\sin(\theta_2) = \eta^2 + \mu^2 + 2*\eta*\mu*\sin(\theta_1 - \theta_2)$$

Similarly, when the first received signal is $\eta(\sin(\theta_1)+j*\cos(\theta_1))$ and the second received signal is $\mu(\cos(\theta_2)-j*\sin(\theta_2))$, a difference between the first received signal and the second received signal may be calculated as $\{\eta \sin(\theta_1)+\mu \cos(\theta_2)\}+*j*\{\eta \cos(\theta_1)-\mu \sin(\theta_2)\}$.

Here, |REAL(first received signal−second received signal)|$^2$+|IMAGINARY(first received signal−second signal)|$^2$ may be calculated and arranged as follows:

$$\eta^2 * \sin(\theta_1)^2 + \mu^2 * \cos(\theta_2)^2 - 2*\eta*\mu*\sin(\theta_1)\cos(\theta_2) + \eta^2 * \cos(\theta_1)^2 +$$
$$\mu^2 * \sin(\theta_2)^2 + 2*\eta*\mu*\cos(\theta_1)\sin(\theta_2) = \eta^2 + \mu^2 - 2*\eta*\mu*\sin(\theta_1 - \theta_2)$$

By adding up the arranged two equations, Equation 4 may be induced.

Depending on embodiments, another equation may be induced using a relationship between a multiplication of real numbers between an addition of the first received signal and second received signal and a difference between the first received signal and the second received signal, and a multiplication of imaginary values between the addition and the difference.

REAL(first received signal+second received signal)*REAL(first received signal−second received signal)+IMAGINARY(first received signal+second received signal)*IMAGINARY(first received signal−second received signal)=$\eta^2-\mu^2$    [Equation 5]

Equation 5 may be induced through the following process. Using the aforementioned Equations 1 and Equation 2 of the first received signal and the second received signal, an addition of and a difference between the first received signal and the second received signal may be calculated as $\eta \sin(\theta_1)+\mu \cos(\theta_2)\}+j*\{\eta \cos(\theta_1)-\mu \sin(\theta_2)$ and $\eta \sin(\theta_1)-\mu \cos(\theta_2)\}+j*\cos(\theta_1)+\mu \sin(\theta_2)$, respectively.

Accordingly, the left term of Equation 5 may be briefly arranged as the right term of Equation 5. REAL(first received signal+second received signal)*REAL(first received signal−second received signal) may be calculated as $\eta^2*\sin(\theta_1)^2-\mu^2*\cos(\theta_2)^2$, and IMAGINARY(first received signal+second received signal)*IMAGINARY(first received signal−second received signal) may be calculated as $\eta^2*\cos(\theta_1)^2-\mu^2*\sin(\theta_2)^2$.

An addition of the above calculation results may be arranged to $\eta^2-\mu^2$.

A value of (first received signal−second received signal) may be calculated using Equation 4 and Equation 5. Here, Equation 6 may be used.

$Rcd*x+Icd*y=\delta$ $Rcd^2+x^2+Icd^2+y^2=\rho$    [Equation 6]

Here, a difference x between the real number portions of the first received signal and the second received signal and a difference y between the imaginary number portions of the first received signal and the second received signal may be calculated. In Equation 6, Rcd denotes an addition of the real number portions of the first received signal and the second received signal, Icd denotes an addition of the imaginary number portions of the first received signal and the second received signal, $\delta$ denotes $\eta^2-\mu^2$, and $\rho$ denotes $2*(\eta^2+\mu^2)$.

Initially, y may be solved as follows:

$\{Rcd^2+Icd^2\}*y^2+2*\{-Icd*\delta\}*y+\{Rcd^4+Rcd^2*Icd^2+\delta^2-\rho*Rcd^2\}=0$ Here, for easy arrangement, when it is assumed that a1=$\{Rcd^2+Icd^2\}$, b1=$\{-Icd*\delta\}$, and c1=$\{Rcd^4+Rcd^2*Icd^2+\delta^2-\rho*Rcd^2\}$, y may be calculated as $$y = \frac{-b1 \pm \sqrt{b1^2 - a1*c1}}{a1}$$

using a root equation.

When calculating x according to Equation 6 using y, x may be calculated as x=$(\delta-Icd*y)/Rcd$.

Similar to the aforementioned method, a difference between the real number portions of the first received signal and the second received signal may be solved as follows:

$\{Rcd^2+Icd^2\}*x^2+2*\{-Rcd*\delta\}*y+\{Icd^4+Rcd^2*Icd^2+\delta^2-\rho*Icd^2\}=0$ For substitution into a root equation, substitution may be performed as a2=$\{Rcd^2+Icd^2\}$, b2=$\{-Rcd*\delta\}$, and c2=$\{Icd^4+Rcd^2*Icd^2+\delta^2-\rho*Icd^2\}$. Accordingly, the difference x between the real number portions of the first received signal and the second received signal may be calculated as $$x = \frac{-b2 \pm \sqrt{b2^2 - a2*c2}}{a2}.$$

Also, y may be calculated using x. Accordingly, y may be calculated as y=$(\delta-Rcd*x)/Icd$ and thus, the receiver may calculate the difference between the first received signal and the second received signal as "x+j*y" in operation 130.

When obtaining solutions of x and y using the root equation by referring to the following Table 1, a sign may be determined. Table 1 may be used to describe values of x and y according to an attenuation rate and a phase-modulation.

TABLE 1

| First transmission signal | Second transmission signal | $\eta >= \mu$ | | $\eta < \mu$ | |
|---|---|---|---|---|---|
| $\cos(\theta_1) + j*\sin(\theta_1)$ | $\sin(\theta_2) + j*\cos(\theta_2)$ | $(-b1 - \sqrt{b1^2 - a1*c1})/a1$ | y | $(-b2 + \sqrt{b2^2 - a2*c2})/a2$ | x |
| $\cos(\theta_1) + j*\sin(\theta_1)$ | $\sin(\theta_2) - j*\cos(\theta_2)$ | $(-b1 + \sqrt{b1^2 - a1*c1})/a1$ | y | $(-b2 + \sqrt{b2^2 - a2*c2})/a2$ | x |
| $\cos(\theta_1) + j*\sin(\theta_1)$ | $-\sin(\theta_2) + j*\cos(\theta_2)$ | $(-b1 - \sqrt{b1^2 - a1*c1})/a1$ | y | $(-b2 + \sqrt{b2^2 - a2*c2})/a2$ | x |
| $\cos(\theta_1) + j*\sin(\theta_1)$ | $-\sin(\theta_2) - j*\cos(\theta_2)$ | $(-b1 + \sqrt{b1^2 - a1*c1})/a1$ | y | $(-b2 + \sqrt{b2^2 - a2*c2})/a2$ | x |
| $\cos(\theta_1) - j*\sin(\theta_1)$ | $\sin(\theta_2) + j*\cos(\theta_2)$ | $(-b1 - \sqrt{b1^2 - a1*c1})/a1$ | y | $(-b2 + \sqrt{b2^2 - a2*c2})/a2$ | x |
| $\cos(\theta_1) - j*\sin(\theta_1)$ | $\sin(\theta_2) - j*\cos(\theta_2)$ | $(-b1 + \sqrt{b1^2 - a1*c1})/a1$ | y | $(-b2 + \sqrt{b2^2 - a2*c2})/a2$ | x |
| $\cos(\theta_1) - j*\sin(\theta_1)$ | $-\sin(\theta_2) + j*\cos(\theta_2)$ | $(-b1 - \sqrt{b1^2 - a1*c1})/a1$ | y | $(-b2 + \sqrt{b2^2 - a2*c2})/a2$ | x |
| $\cos(\theta_1) - j*\sin(\theta_1)$ | $-\sin(\theta_2) - j*\cos(\theta_2)$ | $(-b1 + \sqrt{b1^2 - a1*c1})/a1$ | y | $(-b2 + \sqrt{b2^2 - a2*c2})/a2$ | x |

For example, when $\cos(\theta_1)-j*\sin(\theta_1)$ is selected for phase-modulating the first source signal based on the assumption that $\eta=2$ and $\theta_1=60$ degrees, the first received signal may be $2*(\cos(60°)-j*\sin(60°))$. Also, when $-\sin(\theta_2)-j*\cos(\theta_2)$ is selected for phase-modulating the second source signal based on the assumption that $\mu=0.5$ and $\theta_2=25$ degrees, the second received signal may be $0.5*(-\sin(25°)-j*\cos(25°))$. Accordingly, an addition of the first received signal and the second received signal may be calculated as $\{2*\cos(60°)-0.5*\sin(25°)\}-j*\{2*\sin(60°)+0.5*\cos(25°)\}=0.7887-j*2.1852$.

According to the aforementioned method, the first source signal and the second source signal may be inferred using the addition of the first received signal and the second received signal.

According to an embodiment, by finding, from Table 1, an equation used for phase-modulation and by comparing $\eta$ and $\mu$, it can be verified that if $\eta>\mu$, $y=(-b1+\sqrt{b1^2-a1*c1})/a1$.

Referring to values of x and y induced according to Equation 6, $y=-1.2789$ and $x=1.2113$ and thus, it can be known that the difference between the first received signal and the second received signal is $1.2113-j*1.2789$. The first received signal may be obtained by adding up the addition of and the difference between the first received signal and the second received signal, and by dividing the addition result by "2". The second received signal may be obtained by performing subtraction on the addition of and the difference between the first received signal and the second received signal and by dividing the subtraction result by "2".

Accordingly, the first received signal and the second received signal may be calculated as "first received signal= $(0.7887-j*2.1852+1.2113-j*1.2789)/2=1.0000-j*1.7321$" and "second received signal=$(0.7887-j*2.1852-1.2113+j*1.2789)/2=-0.2113-j*0.4532$", respectively.

An original phase may be obtained by demodulating a phase from each of the first received signal and the second received signal. According to an embodiment, considering that the first source signal is a signal phase-modulated to $\cos(\theta_1)-j*\sin(\theta_1)$, a phase $\theta_1$ of $1.0000-j1.7321$ may be calculated as 60 degrees. Also, considering that the second) source signal is a signal phase-modulated to $-\sin(\theta_2)-j*\cos(\theta_2)$, a phase of $-0.2113-j*0.4532$ may be calculated as 25 degrees.

Figure 3:
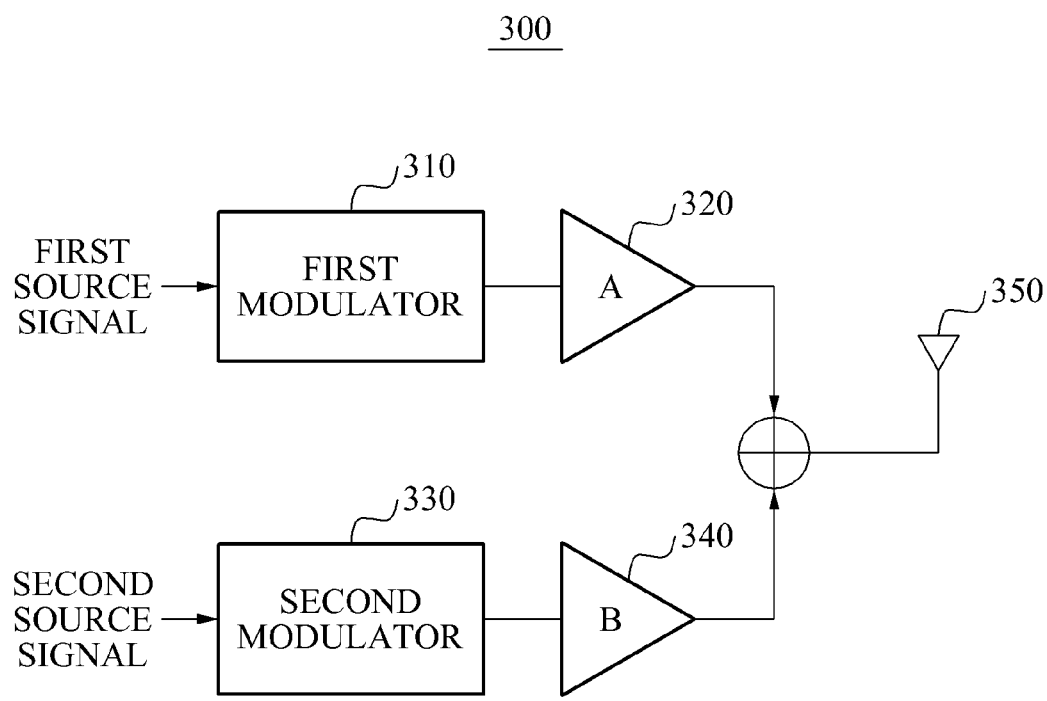
FIG. 3 is a diagram illustrating a configuration of a transmitter configured to generate and transmit two phase-modulated signals having different amplitudes according to an embodiment of the present invention.

FIG. 3 is a diagram illustrating a configuration of a transmitter 300 configured to generate and transmit two phase-modulated signals having different amplitudes according to an embodiment of the present invention. Referring to FIG. 3, the transmitter 300 refers to an apparatus that is configured to phase-modulate a first source signal and a second source signal and then transmit the phase-modulated first source signal and second source signal to a receiver, and may include a first modulator 310, a second modulator 320, an amplifier A 330, an amplifier B 340, and an antenna 350 via which a signal is transmitted.

The first source signal and the source signal may be modulated to have different phases, and may be modulated using different modulators. For example, the first source signal may be phase-modulated using the first modulator 310 and the second source signal may be phase-modulated using the second modulator 320. Each of the first modulator 310 and the second modulator 320 may perform phase-modulation by referring to Table 1.

Amplitudes of the phase-modulated first source signal and second source signal may be amplified using different amplifiers, respectively. For example, the amplifier A 330 may amplify the phase-modulated first source signal by A. The amplifier B 340 may amplify the phase-modulated second source signal by B. Here, A and B may denote different constants, respectively.

The modulated and thereby amplified first source signal and second source signal may be referred to as a first transmission signal and a second transmission signal, respectively, and may be merged as a single signal and thereby transmitted to the receiver using the antenna 350. A signal to be transmitted to the receiver may refer to Equation 1 and Equation 2.

Figure 4:
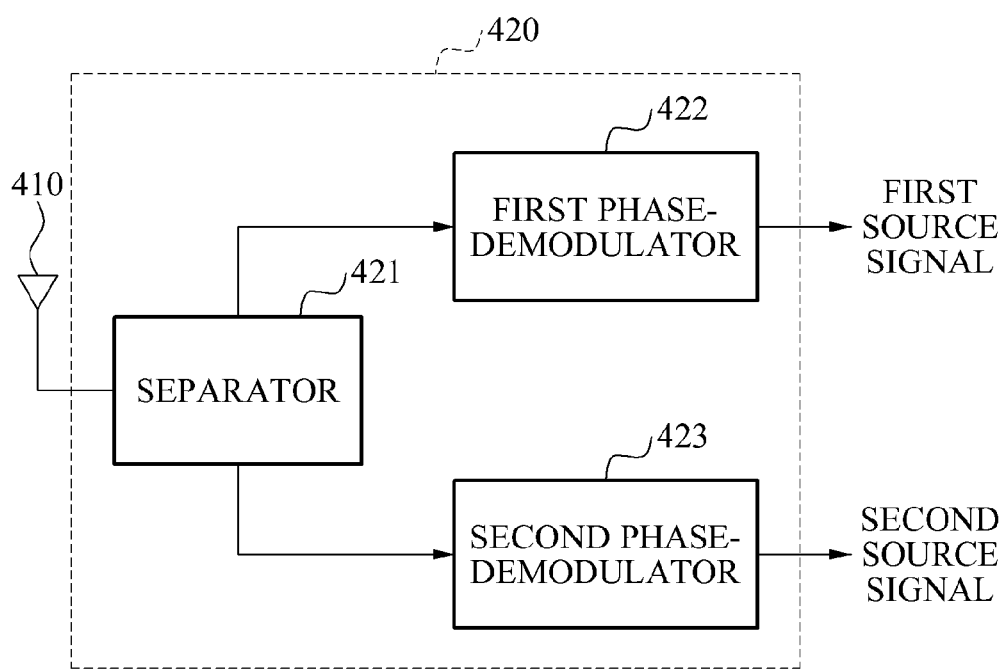
FIG. 4 is a diagram illustrating a configuration of a receiver configured to receive and separate two phase-modulated signals having different amplitudes according to an embodiment of the present invention.

FIG. 4 is a diagram illustrating a configuration of a receiver 400 configured to receive and separate two phase-modulated signals having different amplitudes according to an embodiment of the present invention. Referring to FIG. 4, the receiver 400 may include a configuration of receiving and separating phase-modulated signals merged into a single signal and thereby demodulating the phase-modulated signals to original signals.

The receiver 400 may receive a first received signal and a second received signal that are transmitted from a transmitter using an antenna 410. Here, the receiver 400 may receive a merged signal in which the first received signal and the second received signal are merged. The first received signal and the second received signal may refer to signals in which the first transmission signal and the second transmission signal from the transmitter are attenuated by a transmission loss, respectively.

The receiver 400 may include a demodulator 420 configured to separate the first received signal and the second received signal by dividing each of the first received signal and the second received signal into a real number portion and an imaginary number portion, and to demodulate the first received signal and the second received signal.

The demodulator 420 may include a separator 421 configured to separate the first received signal and the second received signal, a first phase-demodulator 422 configured to demodulate the first received signal, and a second phase-modulator 423 configured to demodulate the second received signal.

The separator 421 may calculate an attenuation level of each of the first received signal and the second received signal by dividing each of the first received signal and the second received signal into a real number portion and an imaginary number portion, may calculate a difference between the first received signal and the second received signal, and may separate the first received signal and the second received signal using the calculation results.

According to an embodiment, a square of an absolute value of an addition of real number portions of the merged signal in which the first received signal and the second received signal, a square of an absolute value of an addition of imaginary number portions of the merged signal, a square of an absolute value of a difference between the real number portions of the merged signal, and a square of an absolute value of a difference between the imaginary number portions of the merged signal may be added up. The addition result may be used, which may refer to Equation 5.

Also, the separator 421 may calculate the difference between the first received signal and the second received signal using Equation 4 and Equation 5. A description related thereto may refer to Equation 6 and a description made in relation thereto. When the addition of and the difference between the first received signal and the second received signal are known, the separator 421 may separate the first received signal and the second received signal.

The separated first received signal and second received signal may be transferred to the first phase-demodulator 422 and the second phase-demodulator 423, respectively. The first phase-demodulator 422 and the second phase-demodulator 423 may demodulate the transferred first received signal and second received signal to a first source signal and a second source signal, respectively. In this example, values of x and y according to phase-modulation and an attenuation rate disclosed in Table 1 may be used.

According to embodiments of the present invention, there may be provided an apparatus and method that enables a receiver to separate two phase-modulated signals having different amplitudes and thereby restore the separated signals to original signals when the two phase-modulated signals having different amplitudes are transmitted using a single antenna.

Also, according to embodiments of the present invention, when there is a need to simultaneously provide two services using the same spectrums and a single antenna, for example, when wide-area broadcasting and local broadcasting are to be simultaneously transmitted, the present invention may be employed to develop a transmission/reception and modulation/demodulation apparatus of a wireless communication field in which a hierarchical service separation is required.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A separation method for a phase-modulated signal, the method comprising:

receiving, using a single antenna, a signal comprising a first received signal and a second received signal that are modulated and thereby transferred from a transmitter;

calculating an attenuation level of each of the first received signal and the second received signal by dividing each of the first received signal and the second received signal into a real number portion and an imaginary number portion;

calculating a difference between the first received signal and the second received signal; and separating and thereby demodulating the first received signal and the second received signal based on the signal comprising the first received signal and the second received signal, and the difference between the first received signal and the second received signal.

2. The method of claim 1, wherein the receiving comprises receiving a merged signal in which the first received signal and the second received signal are merged, the first received signal is a signal in which a first transmission signal from the transmitter is attenuated by a transmission loss, and the second received signal is a signal in which a second transmission signal from the transmitter is attenuated by the transmission loss.

3. The method of claim 1, wherein the first received signal has a form of $\eta(\sin(\theta_1)+j^*\cos(\theta_1))$, the second received signal has a form of $\mu(\cos(\theta_2)-j^*\sin(\theta_2))$, $\sin(\theta_1)+j^*\cos(\theta_1)$ represents the first transmission signal, $\eta$ denotes an attenuation rate of the first transmission signal by the transmission loss with respect to the first transmission signal, $\cos(\theta_2)-j^*\sin(\theta_2)$ represents the second transmission signal, and $\mu$ denotes an attenuation rate of the second transmission signal by the transmission loss with respect to the second transmission signal.

4. The method of claim 3, wherein the calculating of the attenuation level comprises:

adding up a square of an absolute value of an addition of real number portions of a merged signal in which the first received signal and the second received signal are merged, a square of an absolute value of an addition of imaginary number portions of the merged signal, a square of an absolute value of a difference between the real number portions of the merged signal, and a square of an absolute value of a difference between the imaginary number portions of the merged signal; and calculating the attenuation level of each of the first received signal and the second received signal using the addition result.

5. The method of claim 4, wherein the calculating of the attenuation level comprises uses the following equation:

REAL(first received signal+second received signal)
*REAL(first received signal−second received signal)+IMAGINARY(first received signal+second received signal)*IMAGINARY(first received signal−second received signal)=$\eta^2-\mu^2$.

6. The method of claim 1, wherein the calculating of the difference between the first received signal and the second received signal uses the following equations:

REAL(first received signal+second received signal)
*REAL(first received signal−second received signal)+IMAGINARY(first received signal+second received signal)*IMAGINARY(first received signal−second received signal)=$\eta^2-\mu^2$; and

|REAL(first received signal+second received signal)|$^2$+|IMAGINARY(first received signal+second received signal)|$^2$+|REAL(first received signal−second received signal)|$^2$+|IMAGINARY(first received signal−second received signal)|$^2$=2*($\eta^2+\mu^2$).

7. The method of claim 6, wherein the separating and thereby demodulating comprises calculating a real number portion and an imaginary number portion of each of the first received signal and the second received signal using the following equations:

REAL(first received signal+second received signal)
*REAL(first received signal−second received signal)+IMAGINARY(first received signal+second received signal)*IMAGINARY(first received signal−second received signal)=$\eta^2-\mu^2$; and

|REAL(first received signal+second received signal)|$^2$+|IMAGINARY(first received signal+second received signal)|$^2$+|REAL(first received signal−second received signal)|$^2$+|IMAGINARY(first received signal−second received signal)|$^2$=2*($\eta^2+\mu^2$).

8. The method of claim 7, wherein the calculating of the real number portion and the imaginary number portion comprises:
calculating a difference x between the real number portions of the first received signal and the second received signal and a difference y between the imaginary number portions of the first received signal and the second received signal using the following equation $Rcd*x+Icd*y=\delta$ $Rcd^2+x^2+Icd^2+y^2=\rho$; and calculating the real number portion and the imaginary number portion of each of the first received signal and the second received signal using the difference x and the difference y, and
Rcd denotes an addition of the real number portions of the first received signal and the second received signal, Icd denotes an addition of the imaginary number portions of the first received signal and the second received signal, $\delta$ denotes $\eta^2-\mu^2$, and $\rho$ denotes $2*(\eta^2+\mu^2)$.

9. A separation method for a phase-modulated signal, the method comprising:
phase-modulating a first source signal and a second source signal;
generating a first transmission signal by multiplying the phase-modulated first source signal by constant A;
generating a second transmission signal by multiplying the phase-modulated second source signal by constant B; and
transmitting the first transmission signal and the second transmission signal to a receiver using a single antenna,
wherein the first transmission signal has any one form of $\alpha(\sin(\theta_1)+j*\cos(\theta_1)), \alpha(\sin(\theta_1)-j*\cos(\theta_1))$, $\alpha(-\sin(\theta_1)+j*\cos(\theta_1)), \alpha(-\sin(\theta_1)-j*\cos(\theta_1))$, and the second transmission signal has any one form of $\beta(\sin(\theta_2)+j*\cos(\theta_2)), \beta(\sin(\theta_2)-j*\cos(\theta_2))$, $\beta(-\sin(\theta_2)+j*\cos(\theta_2)), \beta(-\sin(\theta_2)-j*\cos(\theta_2))$, and wherein $\theta_1$ and $\theta_2$ satisfy |minimum value of $\theta_1$−maximum value of $\theta^2$|<180 degrees and |minimum value of $\theta_2$−maximum value of $\theta_1$|<180 degrees.

10. The method of claim 9, further comprising:
receiving, using the receiver, a merged signal in which a first received signal in which the first transmission signal is attenuated by a transmission loss and a second received signal in which the second transmission signal is attenuated by the transmission loss are merged; and
separating, using the receiver, and thereby demodulating the first received signal and the second received signal,
wherein the separating and thereby demodulating comprises:
calculating an attenuation level of each of the first received signal and the second received signal by dividing each of the first received signal and the second received signal into a real number portion and an imaginary number portion;
calculating a difference between the first received signal and the second received signal; and
separating and thereby demodulating the first received signal and the second received signal.

11. A receiver, comprising:
an antenna configured to receive a merged signal in which a first received signal in which a first transmission signal is attenuated by a transmission loss and a second received signal in which a second transmission signal is attenuated by the transmission loss are merged; and
a demodulator configured to separate the first received signal and the second received signal by dividing each of the first received signal and the second received into a real number portion and an imaginary number portion, and to demodulate the first received signal and the second received signal,
wherein the demodulator is configured to add up a square of an absolute value of an addition of real number portions of the merged signal, a square of an absolute value of an addition of imaginary number portions of the merged signal, a square of an absolute value of a difference between the real number portions of the merged signal, and a square of an absolute value of a difference between the imaginary number portions of the merged signal, and to calculate an attenuation level of each of the first received signal and the second received signal using the addition result.

* * * * *